US008655859B2

(12) United States Patent
Chen et al.

(10) Patent No.: US 8,655,859 B2
(45) Date of Patent: Feb. 18, 2014

(54) CONCURRENCY CONTROL FOR EXTRACTION, TRANSFORM, LOAD PROCESSES

(75) Inventors: Ying Chen, San Jose, CA (US); Bin He, San Jose, CA (US); Rui Wang, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 547 days.

(21) Appl. No.: 12/714,929

(22) Filed: Mar. 1, 2010

(65) Prior Publication Data

US 2011/0213756 A1    Sep. 1, 2011

(51) Int. Cl.
*G06F 7/00* (2006.01)
*G06F 17/00* (2006.01)

(52) U.S. Cl.
USPC .......................................... 707/704; 707/684

(58) Field of Classification Search
USPC .......................................... 707/684, 999.008
See application file for complete search history.

(56) References Cited

U.S. PATENT DOCUMENTS

| | | | | |
|---|---|---|---|---|
| 5,459,862 A | * | 10/1995 | Garliepp et al. | 707/999.008 |
| 5,692,178 A | * | 11/1997 | Shaughnessy | 707/999.008 |
| 6,389,420 B1 | * | 5/2002 | Vahalia et al. | 707/999.008 |
| 7,752,230 B2 | * | 7/2010 | Bland et al. | 707/802 |
| 2002/0080789 A1 | * | 6/2002 | Henderson et al. | 370/392 |
| 2002/0198902 A1 | | 12/2002 | Sankaran et al. | |
| 2003/0182285 A1 | * | 9/2003 | Kuwata et al. | 707/999.008 |
| 2007/0112802 A1 | * | 5/2007 | Volanen et al. | 707/100 |
| 2008/0189350 A1 | * | 8/2008 | Vasa et al. | 709/201 |
| 2009/0299987 A1 | * | 12/2009 | Willson | 707/999.004 |
| 2009/0300416 A1 | * | 12/2009 | Watanabe et al. | 714/19 |
| 2010/0114841 A1 | * | 5/2010 | Holenstein et al. | 707/690 |
| 2010/0161573 A1 | * | 6/2010 | Chan et al. | 707/704 |

* cited by examiner

*Primary Examiner* — Charles Lu
(74) *Attorney, Agent, or Firm* — Cantor Colburn LLP

(57) ABSTRACT

System and methods manage concurrent ETL processes accessing a database. Exemplary embodiments include a method for concurrency management for ETL processes in a database having database tables and communicatively coupled to a computer, the method including establishing a session lock for the database, determining that a current ETL process is accessing the database at a current time, associating a current expiration time with the session lock, the expiration time being stored in a lock table in the database, sending the session lock to the current ETL process and performing ETL-level locking for the current ETL process.

20 Claims, 8 Drawing Sheets

| TABLE_NAME | EXPIRATION_TIME |
|---|---|
| R | 2008-10-01:16:12:13.234 |
| S | 2008-10-01:16:12:13.234 |
| T | 2008-10-01:18:15:22.569 |
| ... | ... |

FIG. 5

| TABLE_NAME | LOCK_TYPE | EXPIRATION_TIME | ID |
|---|---|---|---|
| R | READ | 2008-10-01:16:12:13.234 | 34253433 |
| S | WRITE | 2008-10-01:16:12:13.234 | 34253433 |
| T | READ | 2008-10-01:18:15:22.569 | 95473734 |
| ... | ... | ... | ... |

FIG. 7

| TABLE_NAME | MAX_KEY | ISDONE |
|---|---|---|
| R | 100 | yes |
| S | 200 | no |
| T | 300 | yes |
| ... | ... | ... |

FIG. 9

CONCURRENCY CONTROL FOR EXTRACTION, TRANSFORM, LOAD PROCESSES

BACKGROUND

The present invention relates to extraction, transform, load (ETL) processes in databases, and more specifically, to systems and methods for concurrency control for multiple ETL processes implementing ETL-level locking and rollback for process failures.

Currently, business enterprises are building sizable databases to enable analytics to improve business performance. ETL is a process to load data into a database. Often, users run multiple ETL processes on one database, either accidentally or intentionally. For example, two users may both load data into one database at the same time without knowing each other's action. If a user knows that two ETL processes touch two disjointed parts of a database, these two processes should be able to be executed simultaneously. However, if there are multiple ETL processes performing simultaneously on one database, there may be data inconsistency. The loading result may not be the same as the ETL processes done one by one. Since an ETL process usually consists of multiple database transactions, the transaction-level concurrency control in database cannot guarantee the ETL-level consistency. Therefore, it is important that the loading tool can guarantee the data consistency with concurrent ETL processes. The effect (i.e., the loading result) of concurrent ETL processes should be the same as if those processes are executed one by one, which is called the serialization of ETL processes. Although database systems currently support transaction-level locks to guarantee the data consistency of concurrent transactions, the database systems cannot be used for the ETL processes because an ETL process often include multiple transactions.

SUMMARY

Exemplary embodiments include a method for concurrency management for ETL processes in a database having database tables and communicatively coupled to a computer, the method including establishing a session lock for the database, determining that a current ETL process is accessing the database at a current time, associating a current expiration time with the session lock, the expiration time being stored in a lock table in the database, sending the session lock to the current ETL process and performing ETL-level locking for the current ETL process.

Additional exemplary embodiments include a database communicatively coupled to a computer having a current ETL process, the database including data accessible to the current ETL process, at least one database table including the data accessible to the ETL process and a lock table including an expiration time value for a subsequent ETL process, the subsequent ETL process accessing data accessible to the current ETL process in the at least one database table.

Further exemplary embodiments include a computer program product for concurrency management for extraction, transform, load (ETL) processes in a database having database tables and communicatively coupled to a computer, the computer program product including instructions for causing the computer to implement a method, the method including establishing a session lock for the database, determining that a current ETL process is accessing the database at a current time, associating a current expiration time with the session lock, the expiration time being stored in a lock table in the database, sending the session lock to the current ETL process and performing ETL-level locking for the current ETL process.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE SEVERAL VIEWS OF THE DRAWINGS

The subject matter which is regarded as the invention is particularly pointed out and distinctly claimed in the claims at the conclusion of the specification. The forgoing and other features, and advantages of the invention are apparent from the following detailed description taken in conjunction with the accompanying drawings in which:

FIG. 5 illustrates an exemplary lock table for table level locking for exclusive locks;

FIG. 7 illustrates an exemplary table-level lock table for read-write locks;

FIG. 9 illustrates and exemplary rollback snapshot table.

DETAILED DESCRIPTION

In exemplary embodiments, the systems and methods described herein include a concurrency control mechanism that supports concurrent ETL processes in databases and this manage concurrent ETL processes for databases. The concurrency control mechanism includes a locking mechanism and a rollback mechanism. In exemplary embodiments, the locking mechanism implements database and SQL to realize the concurrency controls. The locking mechanism thus supports both local and remote ETL processes, and is generally applicable for any database. In exemplary embodiments, session locks can be implemented to avoid process failures and implement SQL statements to guarantee the lock atomicity. The exemplary systems and methods described herein support three-level of granularities for various ETL applications: database-level exclusive lock, table-level exclusive lock, and table-level read-write lock. Furthermore, the locking mechanism releases the lock on expiration of a particular time period. The rollback mechanism for multiple ETL processes can guarantee the data consistency in case of ETL process failure, by recovering incompletely loaded records and implementing a rollback snapshot table.

Figure 1:
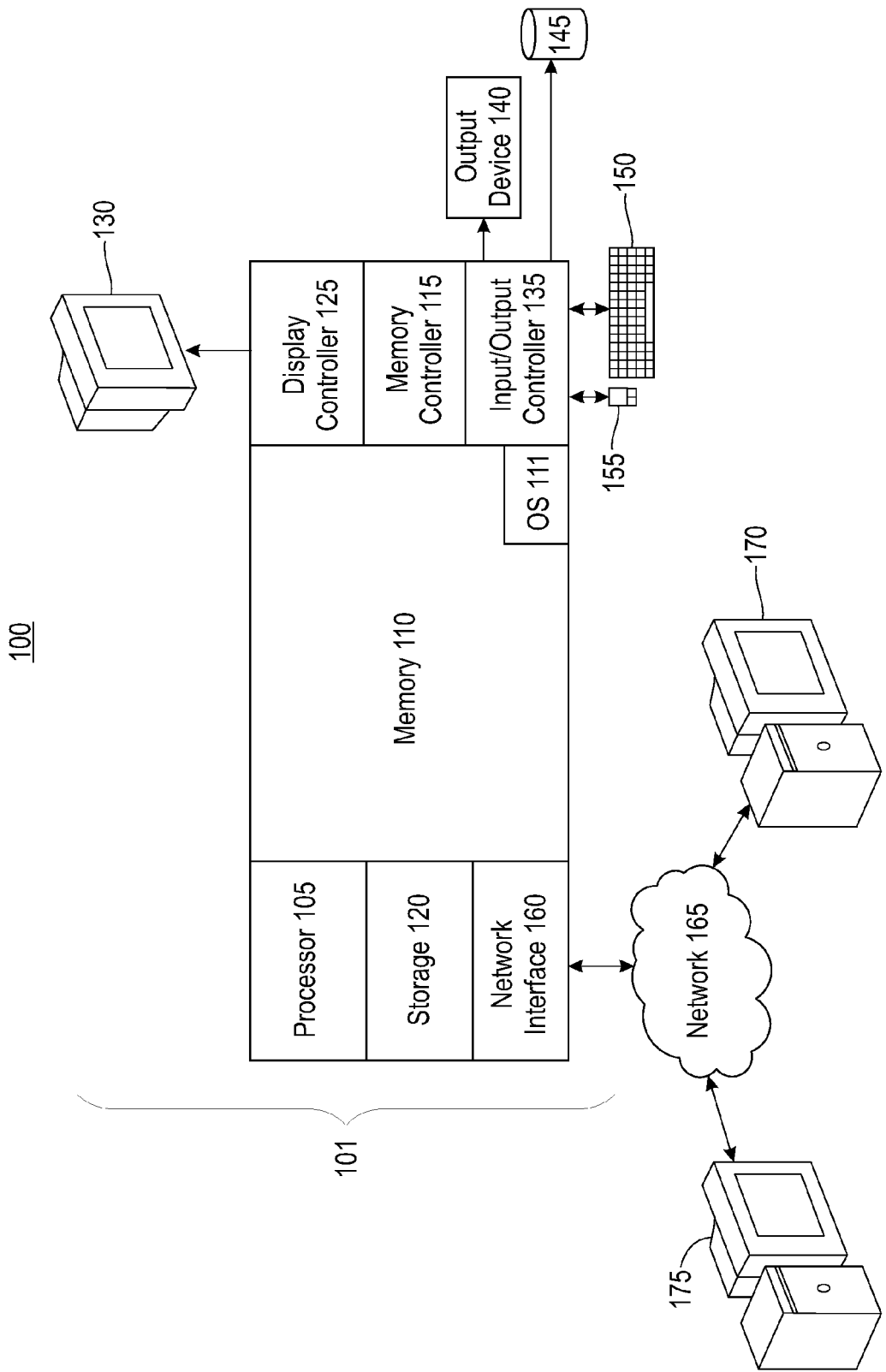
FIG. 1 illustrates an exemplary embodiment of a system for concurrency control for ETL processes.

FIG. 1 illustrates an exemplary embodiment of a system 100 for concurrency control for ETL processes. The methods described herein can be implemented in software (e.g., firmware), hardware, or a combination thereof. In exemplary embodiments, the methods described herein are implemented in software, as an executable program, and is executed by a special or general-purpose digital computer, such as a personal computer, workstation, minicomputer, or mainframe computer. The system 100 therefore includes general-purpose computer 101. In exemplary embodiments, the computer 101 may be a server having a database (e.g., storage media 145) accessed by one or more external computers 170, 175 (e.g., clients) that perform ETL processes on the server's database In exemplary embodiments, in terms of hardware architecture, as shown in FIG. 1, the computer 101 includes a processor 105, memory 110 coupled to a memory controller 115, and one or more input and/or output (I/O) devices 140 (or peripherals) and storage media 145 that are communicatively coupled via a local input/output controller 135. The input/output controller 135 can be, but is not limited to, one or more buses or other wired or wireless connections, as is known in the art. The input/output controller 135 may have additional elements, which are omitted for simplicity, such as controllers, buffers (caches), drivers, repeaters, and receivers, to enable communications. Further, the local interface may include address, control, and/or data connections to enable appropriate communications among the aforementioned components.

The processor 105 is a hardware device for executing software, particularly that stored in memory 110. The processor 105 can be any custom made or commercially available processor, a central processing unit (CPU), an auxiliary processor among several processors associated with the computer 101, a semiconductor based microprocessor (in the form of a microchip or chip set), a macroprocessor, or generally any device for executing software instructions.

The memory 110 can include any one or combination of volatile memory elements (e.g., random access memory (RAM, such as DRAM, SRAM, SDRAM, etc.)) and nonvolatile memory elements (e.g., ROM, erasable programmable read only memory (EPROM), electronically erasable programmable read only memory (EEPROM), programmable read only memory (PROM), tape, compact disc read only memory (CD-ROM), disk, diskette, cartridge, cassette or the like, etc.). Moreover, the memory 110 may incorporate electronic, magnetic, optical, and/or other types of storage media. Note that the memory 110 can have a distributed architecture, where various components are situated remote from one another, but can be accessed by the processor 105.

The software in memory 110 may include one or more separate programs, each of which comprises an ordered listing of executable instructions for implementing logical functions. In the example of FIG. 1, the software in the memory 110 includes the ETL process concurrency management methods described herein in accordance with exemplary embodiments and a suitable operating system (OS) 111. The operating system 111 essentially controls the execution of other computer programs, such the ETL process concurrency management systems and methods as described herein, and provides scheduling, input-output control, file and data management, memory management, and communication control and related services. The software in the memory 110 further includes processes for both the ETL-level locking and the ETL-level rollback as further described herein.

The ETL process concurrency management methods described herein may be in the form of a source program, executable program (object code), script, or any other entity comprising a set of instructions to be performed. When a source program, then the program needs to be translated via a compiler, assembler, interpreter, or the like is used, which may or may not be included within the memory 110, so as to operate properly in connection with the OS 111. Furthermore, the ETL process concurrency management methods can be written as an object oriented programming language, which has classes of data and methods, or a procedure programming language, which has routines, subroutines, and/or functions.

In exemplary embodiments, a conventional keyboard 150 and mouse 155 can be coupled to the input/output controller 135. Other output devices such as the I/O devices 140, may include input devices, for example but not limited to a printer, a scanner, microphone, and the like. Finally, the I/O devices 140 may further include devices that communicate both inputs and outputs, for instance but not limited to, a network interface card (NIC) or modulator/demodulator (for accessing other files, devices, systems, or a network), a radio frequency (RF) or other transceiver, a telephonic interface, a bridge, a router, and the like. The system 100 can further include a display controller 125 coupled to a display 130. In exemplary embodiments, the system 100 can further include a network interface 160 for coupling to a network 165. The network 165 can be an IP-based network for communication between the computer 101 and any external server, client and the like via a broadband connection. The network 165 transmits and receives data between the computer 101 and external systems. In exemplary embodiments, network 165 can be a managed IP network administered by a service provider. The network 165 may be implemented in a wireless fashion, e.g., using wireless protocols and technologies, such as WiFi, WiMax, etc. The network 165 can also be a packet-switched network such as a local area network, wide area network, metropolitan area network, Internet network, or other similar type of network environment. The network 165 may be a fixed wireless network, a wireless local area network (LAN), a wireless wide area network (WAN) a personal area network (PAN), a virtual private network (VPN), intranet or other suitable network system and includes equipment for receiving and transmitting signals.

If the computer 101 is a PC, workstation, intelligent device or the like, the software in the memory 110 may further include a basic input output system (BIOS) (omitted for simplicity). The BIOS is a set of essential software routines that initialize and test hardware at startup, start the OS 111, and support the transfer of data among the hardware devices. The BIOS is stored in ROM so that the BIOS can be executed when the computer 101 is activated.

When the computer 101 is in operation, the processor 105 is configured to execute software stored within the memory 110, to communicate data to and from the memory 110, and to generally control operations of the computer 101 pursuant to the software. The ETL process concurrency management methods described herein and the OS 111, in whole or in part, but typically the latter, are read by the processor 105, perhaps buffered within the processor 105, and then executed.

When the systems and methods described herein are implemented in software, as is shown in FIG. 1, the methods can be stored on any computer readable medium, such as storage 120, for use by or in connection with any computer related system or method.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc. or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

In exemplary embodiments, where the ETL process concurrency management methods are implemented in hardware, the ETL process concurrency management methods described herein can implemented with any or a combination of the following technologies, which are each well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

As described above, the major task of an ETL process is to load data into a database. The systems and methods described herein manage multiple ETL processes performing simultaneously on one database to guarantee the data consistency. To support ETL-level concurrency, the systems and methods described herein preferably include: 1) a locking mechanism to control the concurrency, and 2) a rollback mechanism to recover from process failure for concurrent ETL processes. In exemplary embodiments, the locking mechanism implements database tables and SQL statements to establish concurrency control. In exemplary embodiments, the systems and methods described herein include several ETL-level locking features that are desirable for concurrency control for multiple ETL processes. The features include but are not limited to: a) support of local and remote loadings; b) platform-independence, c) application in a distributed environment, d) support of process failure, e) guarantee of the atomic feature of locking, f) support of database-level and table-level locks, g) support of read locks and write locks, and h) elimination of dead lock cases. In case of failure of an ETL process, an exemplary rollback mechanism guarantees that the incompletely loaded data are removed before the next ETL process starts.

In exemplary embodiments, the exemplary ETL-level locking mechanism supports local or remote loadings. Since concurrent ETL processes in the database may come from either local or remote machines, a file based locking mechanism is not desirable, since a file lock can only be accessed by local ETL processes. The exemplary database based locking mechanism enables all ETL processes to access database table (locally or remotely) via database drivers.

In exemplary embodiments, the exemplary ETL-level locking mechanism allows process failure. An ETL process may fail in the middle of loading and cannot properly exit for various reasons. For example, a user may manually kill the process, or the machine may crash. In such cases, if the lock set by the ETL process cannot be released, other processes cannot proceed. Since the ETL process itself cannot release the lock due to failure, the exemplary locking mechanism can manage the process failures.

In exemplary embodiments, the exemplary ETL-level locking mechanism guarantees the atomic feature (i.e., all the lock setting and releasing operations should be executed as an atomic operation). If the atomic feature is not guaranteed, the data consistency may be violated. For example, the lock setting operation has the following logic: (i) check whether the lock is set; (ii) if it is not set, set the lock; and (iii) otherwise, wait until it is unlocked. If the lock setting operation cannot be executed in an atomic manner, this may cause a data consistency problem. A lock may not set in the beginning, and an ETL process P1 may execute (i). Before P1 executed (ii), another ETL process P2 may execute (i), and then execute (ii) too because the lock is not set yet. In this example, both ETL processes execute (ii) and the lock mechanism is not working. The exemplary ETL-level locking prevents this situation by guaranteeing the atomic feature.

In exemplary embodiments, the exemplary ETL-level locking supports database-level and table-level locks. Some ETL tasks implement database-level locks (i.e., a lock is for an entire database), and others implement table-level locks (i.e., a lock is for a table).

In exemplary embodiments, the exemplary ETL-level locking supports read locks and write locks. An ETL process may read some tables and write other tables. Therefore, supporting both read locks and write locks provides improved concurrency management.

In exemplary embodiments, the exemplary ETL-level locking prevents deadlocks. As such, multiple ETL processes do not form a deadlock circle in which none of them can proceed.

As further described herein, the exemplary systems and methods include ETL-level rollback. When an ETL process fails to complete, it may already make changes on the database, which cannot be recovered by implementing a transaction-level rollback mechanism. The exemplary systems and methods described herein record the snapshots of the database, which can be recovered when a failure occurs. The exemplary rollback mechanism is supported by all the ETL processes.

For illustrative purposes, the exemplary locking and rollback mechanisms described herein are implemented on a general ETL (GETL) toolkit for data warehousing loading. The GETL toolkit provides an illustrative example because the GETL toolkit is widely used in business intelligence applications such as Corporate Brand and Reputation Analysis (COBRA) (to analyze the company's brand reputation) as described in patent application Ser. No. 11/972,238, filed Oct. 29, 2007, and Strategic Information Mining Platform for Licensing and Execution (SIMPLE) (to analyze patent and medline data). However, it is appreciated that in other exemplary embodiments, the locking and rollback mechanisms described herein can be implemented on other ETL toolkits and databases.

One of the features of the exemplary locking mechanism is session locking for ETL process failure. As described herein, the exemplary locking mechanism supports both local and remote access to databases. Conventionally, if an ETL process fails improperly in the middle of loading, the lock is inactive since it is set but cannot be released by its initiating process. As a result, subsequent ETL processes are not able to proceed. The exemplary locking mechanism addresses these inactive locks by implementing session locks. A lock is associated with an expiration future time. For example, if the current timestamp is 2008-10-01:11:12:13.234, a lock L with expiration time 2008-10-01:16:12:13.234 means the lock L expires 5 minutes later. The lock L is considered unlocked if its expiration time is before the current timestamp.

Figure 2:
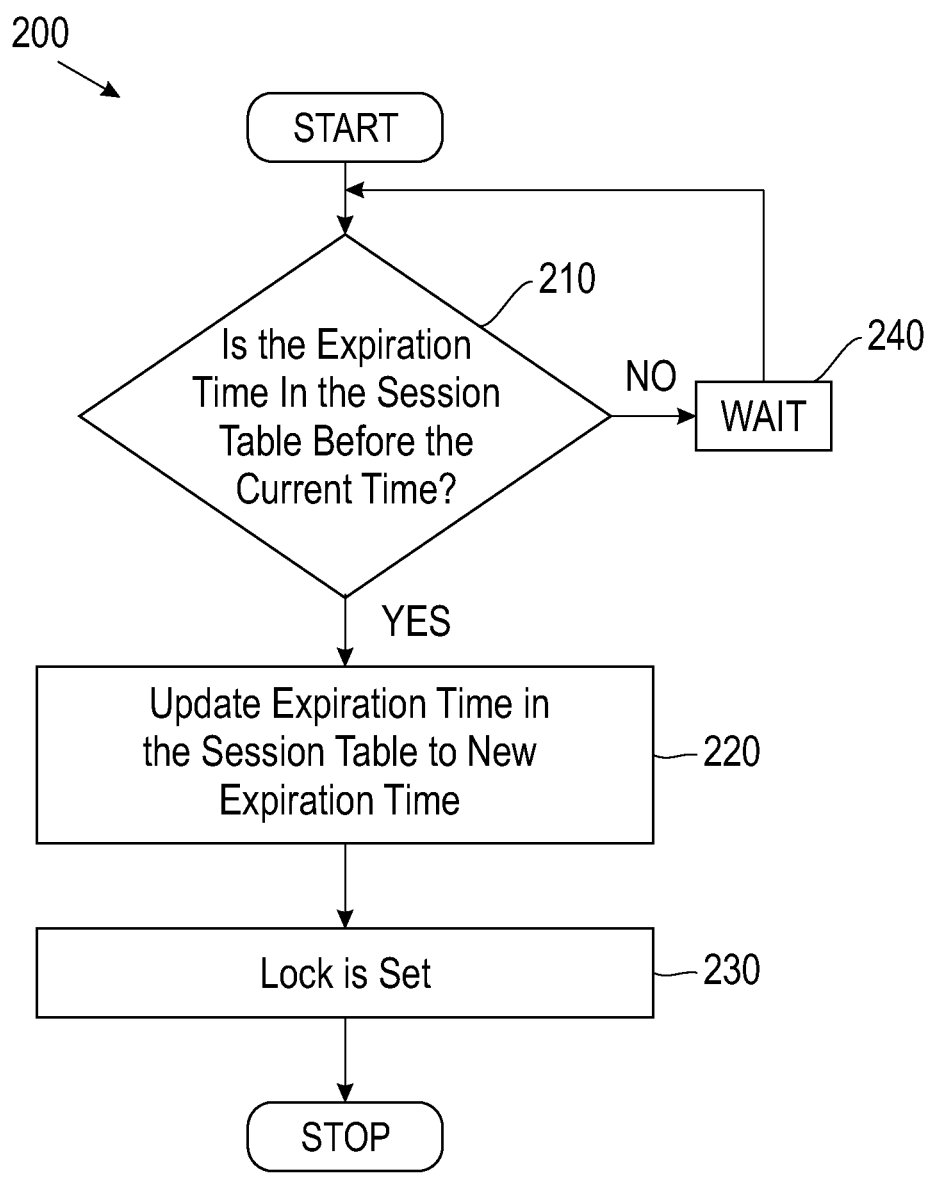
FIG. 2 illustrates a flow chart for an overall method for setting a clock in accordance with exemplary embodiments.

FIG. 2 illustrates a flow chart for an overall method 200 for setting a clock in accordance with exemplary embodiments. At block 210, the method 200 determines whether the expiration time(s) in the session table is before the current time for involved entities. If at block 210 the expiation time is before the current time, then at block 220 the expiration time(s) are updated in the session table to new expiration time(s), and the lock is set at block 230. If at block 210, the expiation time is not before the current time, then at block 240, the ETL process waits for a pre-determined time and checks the expiration time(s) again at block 210. As further described herein, the lock is subsequently unlocked. In exemplary embodiments, SQL statements are implemented to set the expiration time(s) in the session table to current time(s) in an atomic manner.

When an ETL process starts and receives the lock, it initiates a separate thread. The separate thread periodically updates the expiration time of the lock until it finishes the loading process. To ensure the lock is valid during the ETL process, the thread always updates the session expiration time before the lock is expired. That is, if at each time, the thread sets the expiration time as current time+T1, the thread should be executed at current time+T2 (where T2<T1) next time. Usually, T2=T1/2 is an adequate relation to ensure this execution. Before an ETL process receives the lock L, the ETL process first checks whether the L is expired. If the L is expired, the lock is empty and can proceed to use the lock. Otherwise, the lock is currently used by another process and thus the ETL process has to wait. If the ETL process can properly finish, it updates the session expiration time as current time, so that the lock is expired immediately and thus can be used by subsequent ETL processes. In contrast, if the ETL process cannot properly finish, the lock unlocks after the time is expired. As such, the lock is not inactive indefinitely. After time T1, subsequent processes are able to use the lock. The exemplary session locking mechanism can also avoid dead lock situations, since any lock expires eventually.

Figures 3, 4:
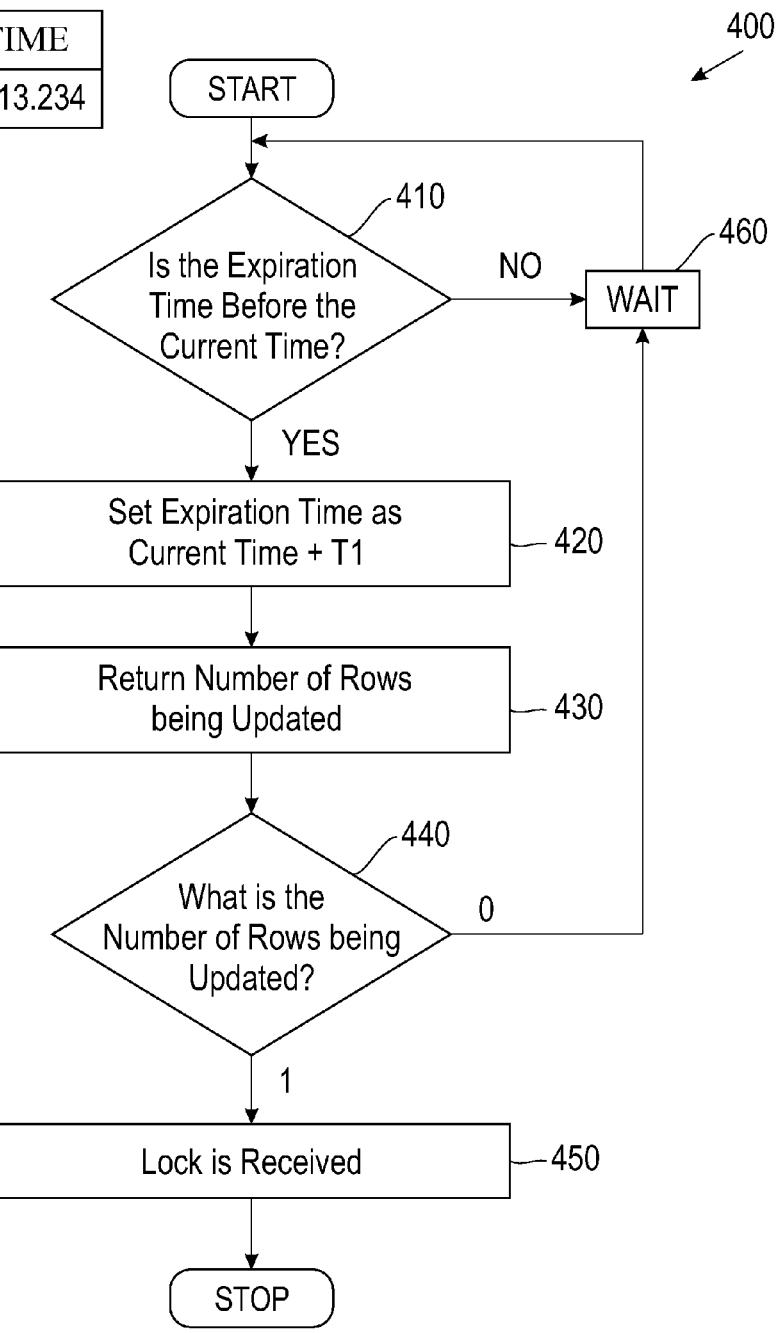
FIG. 3 illustrates an exemplary database-level lock table.
FIG. 4 illustrates a method for setting a lock for database level locking in accordance with exemplary embodiments.

Another feature of the exemplary locking mechanism is database level atomic locking. In the database-level locking, all ETL processes that load data into one database share one lock. Only one ETL process can load data into the database at a time. To support a database-level locking design, a LOCK table is added in the database with an attribute EXPIRATION_TIME as illustrated in FIG. 3. In exemplary embodiments, the attribute has one value: the expiration time for the current session.

The exemplary locking mechanism is implemented in each ETL process. In addition, the exemplary locking mechanism is implemented with atomic operations. In exemplary embodiments, the systems and methods described herein include atomic operations for setting the lock and releasing the lock, which can be implemented via SQL statements.

FIG. 4 illustrates a method 400 for setting a lock for database level locking in accordance with exemplary embodiments. At block 410, the method 400 determines whether the expiration time is before the current time. If the expiration time is before the current time at block 410, then at block 420 the method 400 sets the expiration time as the current time+T1. At block 430, the method 400 returns the number of rows being updated. At block 440, the method 400 determines the number of rows that have been updated. If the number of rows updated is 1 at block 440, the lock has been received at block at block 450. If the number of rows updated is 0, the lock is being used by another process right now, and thus the ETL process has to wait at block 460. In addition, if at block 410, the expiration time is not before the current time, then the ETL process has to wait at block 460. To release the lock, the expiration time is set to current time.

In the example illustrated in FIG. 4, for setting the lock, SQL is implemented to realize the following semantics: (i) check whether the expiration time is before the current time; (ii) if it is, set the expiration time as the current time+T1; and (iii) otherwise, wait some time go to step (i). In exemplary embodiments steps (i) and (ii) are executed in atomic manner. A set of SQL statements constructed to realize (i) and (ii), are executed as a database transaction by utilizing the transaction locks. The following SQL statement can be implemented for database locking:

```
UPDATE LOCK SET EXPIRATION_TIME = CURRENT_TIME( ) +
T1 WHERE EXPIRATION_TIME < CURRENT_TIME( )
```

The CURRENT_TIME( ) function is supported as a built-in function in all databases. This SQL statement returns the number of rows being currently updated. If the number of rows updated is 1, the ETL process has successfully received the lock, and the loading process can proceed. If the number of rows updated is 0, the lock is being used by another process right now, and thus has to wait.

For releasing the lock after the loading is finished, the following SQL statement can be implemented:

```
UPDATE LOCK SET EXPIRATION_TIME = CURRENT_TIME( )
TABLE-LEVEL ATOMIC LOCKING FOR EXCLUSIVE LOCKS
```

The table level locking is a finer granularity than the database level locking mechanism and the database level locking may not be fully necessary in some cases. For example, two ETL processes may load data into two sets of non-overlapping tables, and thus can be executed at the same time. For those cases, a finer granularity of the table level locking mechanism is implemented (i.e., each table has its own session lock). FIG. 5 illustrates an exemplary lock table for exclusive locks.

Figure 6:
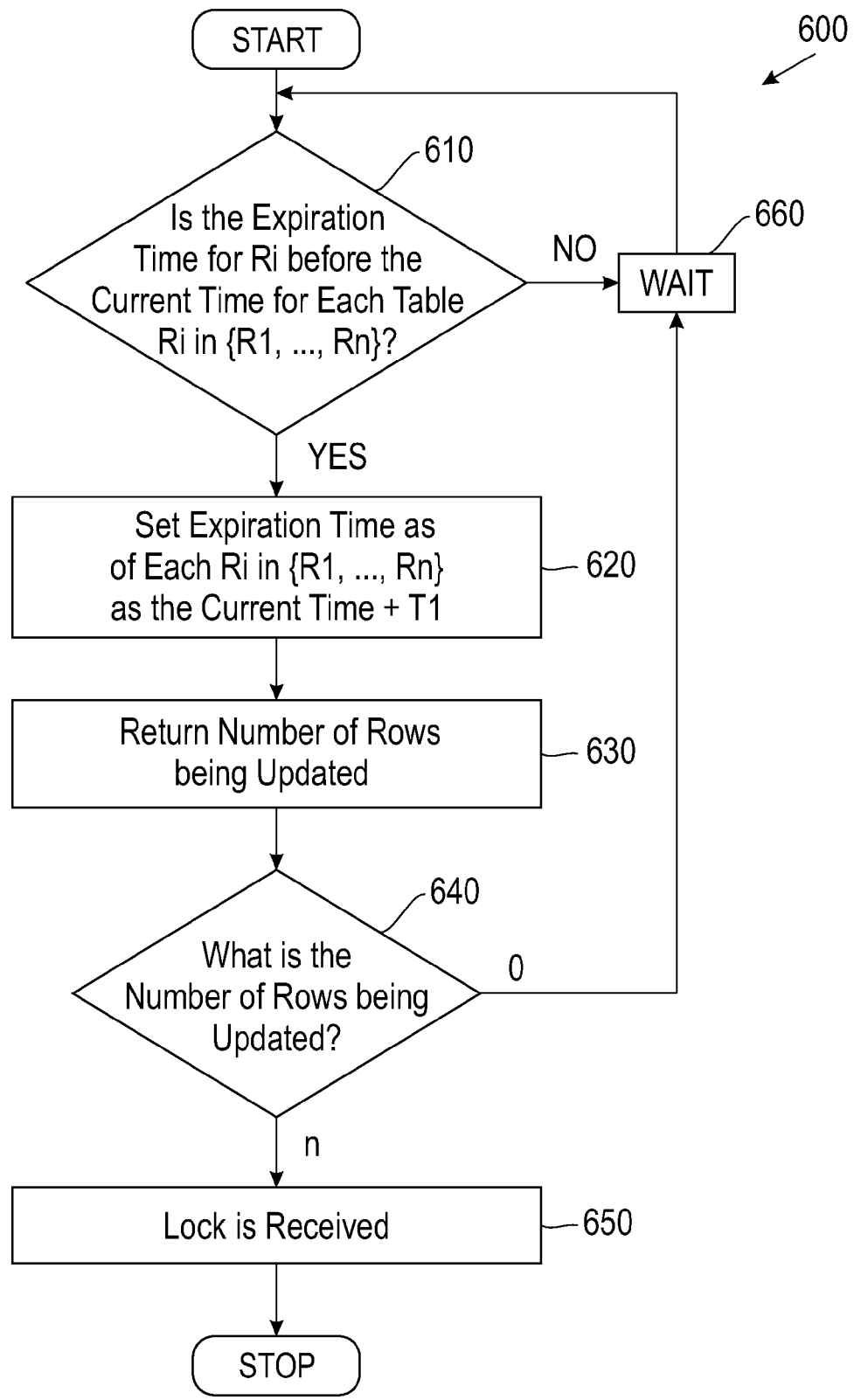
FIG. 6 illustrates a flow chart of a method for setting a lock for table level locking in accordance with exemplary embodiments.

FIG. 6 illustrates a flow chart of a method 600 for setting a lock for table level locking in accordance with exemplary embodiments. At block 610, the method 600 determines whether for each table Ri in $\{R_1, \ldots, Rn\}$, the expiration time of Ri is before the current time. If at block 610, the expiration time for Ri is before the current time for each table Ri in $\{R_1, \ldots, Rn\}$, then at block 620, the method 600 sets the expiration time of each Ri in $\{R_1, \ldots, Rn\}$ as the current time+T1. At block 630, the method 600 returns the number of rows being updated. At block 640, the method 600 determines the number of rows being currently updated. If the number of rows updated at block 640 is n, then the process received the lock at block 650. If the number of rows updated is 0, the lock is being used by another process right now, and thus the ETL process has to wait at block 660. In addition, if at block 610, the expiration time is not before the current time, then the ETL process has to wait at block 660. To release the lock, the expiration times of $R_1, \ldots, Rn$ are set to the current time.

As FIG. 5 illustrates, each table is identified by its table name and associated with an expiration time. In the table level locking, an ETL process can start loading only if the ETL process received all the locks for the tables it needs to use. As such, SQL is implemented to realize the following semantics of the example in FIG. 6: (i) check whether for each table $R_i$ in $\{R_1, \ldots, Rn\}$, the expiration time of $R_i$ is before the current time; (ii) if it is, set the expiration time of each $R_i$ in $\{R_1, \ldots, Rn\}$ as the current time+T1; and (iii) otherwise, wait some time go to (i).

The tables $R_1, \ldots, R_n$ are the set of tables implemented by this ETL process. The locks are also updated periodically until the loading is completed. When the ETL process completes, all the locks are released. Similar to the database level, steps (i) and (ii) are executed in atomic manner (i.e., the n locks have to be either all updated or all not updated). The following SQL statement can be implemented:

```
UPDATE LOCK SET EXPIRATION_TIME = CURRENT_TIME( ) +
T1
WHERE (TABLE_NAME = "R1" OR TABLE_NAME = "R2" OR ...
OR TABLE_NAME = "Rn") AND
    n IN (SELECT COUNT(*) FROM LOCK WHERE
    (TABLE_NAME = "R1" OR TABLE_NAME = "R2" OR ... OR
TABLE_NAME = "Rn") AND
        EXPIRATION_TIME < CURRENT_TIME( ))
```

The UPDATE statement returns the number of rows being currently updated. If the number of rows updated is n, the ETL process has successfully received the locks, and the loading process can proceed. If the number of rows updated is 0, at least one lock is being used by another process at the present time, and thus has to wait.

The sub-query,

```
n IN (SELECT COUNT(*) FROM LOCK WHERE
    (TABLE_NAME = "R1" OR TABLE_NAME = "R2" OR ... OR
TABLE_NAME = "Rn") AND
    EXPIRATION_TIME < CURRENT_TIME( ))
``` is implemented to realize the "if" condition that is checked on all tables, and the constant number "n" refers to the number of tables.

For releasing the lock after the loading is finished, the following SQL statement can be implemented:

```
UPDATE LOCK SET EXPIRATION_TIME = CURRENT_TIME( )
WHERE TABLE_NAME = "R1" OR TABLE_NAME = "R2" OR ...
OR TABLE_NAME = "Rn"
TABLE-LEVEL ATOMIC LOCKING FOR READ-WRITE LOCKS
```

The above-referenced locks have been discussed with respect to exclusive locks. In some cases, an ETL process may only read data from some tables and also write into another set of tables. If there are two ETL processes that read from the same tables, but write into different tables, these two processes can be executed simultaneously. However, with exclusive locks, this concurrency may not be supported. In exemplary embodiments, two types of locks, read lock and write lock, are implemented to address this concurrency problem. FIG. 7 illustrates an exemplary table-level lock table for read-write locks.

As FIG. 7 illustrates, each table is identified by its table name, lock type, expiration time, and ID. The LOCK_TYPE attribute can be either READ or WRITE. The ID attribute is implemented by the atomic operation.

Figure 8:
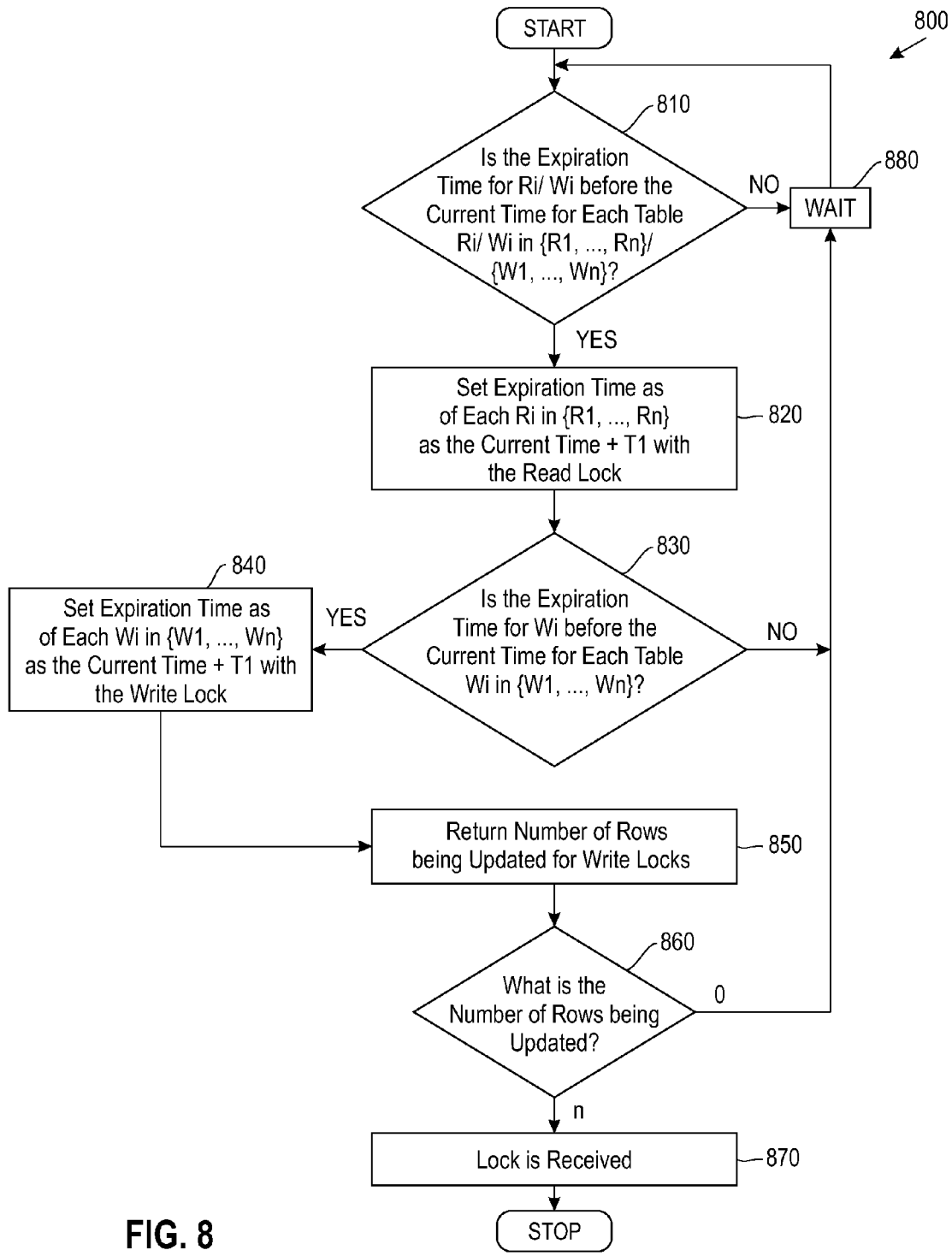
FIG. 8 illustrates a flowchart of a method for setting a lock for table level locking for read-write locks.

FIG. 8 illustrates a flowchart of a method 800 for setting a lock for table level locking for read-write locks. At block 810, the method 800 determines whether for each read-only table Ri in {$R_1$, ..., Rn}, the expiration time of Ri is before the current time, or the lock type is read, and checks whether for each writing table Wi in {$W_1$, ..., Wm}, the expiration time of Wi is before the current time. If at block 810, the expiration time of Ri is before the current time, and the expiration time of Wi is before the current time, then at block 820, the method 800 sets the expiration time of each Ri in {R1, ..., Rn} as the current time+T1 with read lock. If at block 810, the expiration time of Ri is not before the current time, and the expiration time of Wi is not before the current time, then at block 820, the ETL process waits at block 880. At block 830, the method 800 determines whether for each table Wi in {$W_1$, ..., Wm}, the expiration time of Wi is before the current time. If at block 830, the expiration time for Wi is before the current time for each table Wi in {$W_1$, ..., Wm}, then at block 620, the method 600 sets the expiration time of each Wi in {$W_1$, ..., Wm} as the current time+T1 with the write lock. If at block 830, the expiration time of Wi is not before the current time, then the ETL process waits at block 880. At block 850, the method 600 returns the number of rows being updated for write locks. At block 860, the method 600 determines the number of rows being currently updated. If the number of rows updated at block 860 is n, then the process received the lock at block 870. If the number of rows updated is 0, the lock is being used by another process right now, and thus the ETL process has to wait at block 880. To release the lock, the expiration times of $R_1$, ..., Rn, $W_1$, ..., Wn are set to the current time.

In the read-write locking, an ETL process can start loading if it satisfies: a) all the read-only tables it used do not have write locks (read locks are fine); and b) all the writing tables it used are not locked. As such, SQL is implemented to realize the following semantics from the example in FIG. 8: (i) check whether for each read-only table $R_i$ in {$R_1$, ..., $R_n$}, the expiration time of $R_i$ is before the current time, or the lock type is read; (ii) check whether for each writing table $W_i$ in {$W_1$, ..., $W_m$}, the expiration time of $W_i$ is before the current time; (iii) if both (i) and (ii) are true, set the expiration time of each $R_i$ in {$R_1$, ..., $R_n$} as the current time+T1 with read lock, and set the expiration time of each $W_i$ in {$W_1$, ..., $W_m$} as current time+T1 with write lock; and (iv) otherwise, wait some time go to (i).

The locks also need to be updated periodically until the loading is done. When the ETL process finishes, all the locks need to be released. Steps (i) to (iii) are executed in atomic manner. The following SQL statements can be implemented:

```
UPDATE LOCK SET EXPIRATION_TIME = CURRENT_TIME( ) + T1, ID =
id
WHERE (TABLE_NAME = "R1" OR TABLE_NAME = "R2" OR ... OR
TABLE_NAME = "Rn") AND
        n IN (SELECT COUNT(*) FROM LOCK WHERE
            (TABLE_NAME = "R1" OR TABLE_NAME = "R2" OR ...
OR TABLE_NAME = "Rn") AND
                (EXPIRATION_TIME < CURRENT_TIME( ) OR
LOCK_TYPE = "READ")) AND
    m IN (SELECT COUNT(*) FROM LOCK WHERE
            (TABLE_NAME = "W1" OR TABLE_NAME = "W2" OR ...
OR TABLE_NAME = "Wm") AND
                EXPIRATION_TIME < CURRENT_TIME( ))
UPDATE LOCK SET EXPIRATION_TIME = CURRENT_TIME( ) + T1
WHERE n IN (SELECT COUNT(*) FROM LOCK WHERE ID = id) AND
    (TABLE_NAME = "W1" OR TABLE_NAME = "W2" OR ... OR
TABLE_NAME = "Wm") AND
    m IN (SELECT COUNT(*) FROM LOCK WHERE
            (TABLE_NAME = "W1" OR TABLE_NAME = "W2" OR ...
OR TABLE_NAME = "Wm") AND
                EXPIRATION_TIME < CURRENT_TIME( ))
```

The above statements are executed as one database transaction to guarantee the atomicity. The first UPDATE statement sets the read locks by checking both expiration time and the lock types on both read locks and write locks. The first statement updates the read locks only if there is no conflict on any locks. The first statement also sets the ID attribute to a randomly generated integer id. The id is implemented in the second statement, which sets the write locks. The second statement is executed only if the first UPDATE statement has made n updates. The subquery "n IN (SELECT COUNT(*) FROM LOCK WHERE ID=id)" verifies the condition that the UPDATE statement has made n updates. If the first UPDATE does not update n records, the second UPDATE does update anything.

In exemplary embodiments, the second UPDATE statements return the numbers of rows being currently updated for write locks. If the number of rows updated is m, the ETL process has successfully received all the locks, and loading process can proceed. If the number of rows updated is 0, at least one lock conflict exists at the present moment, and thus has to wait.

For releasing the lock after the loading is finished, the following SQL statement can be implemented:

```
UPDATE LOCK SET EXPIRATION_TIME = CURRENT_TIME( ),
LOCK_TYPE = "READ" WHERE TABLE_NAME = "R₁" OR
TABLE_NAME= "R₂" OR ... OR TABLE_NAME = "Rₙ" OR
TABLE_NAME = "W₁" OR TABLE_NAME = "W₂" OR ... OR
TABLE_NAME = "Wₘ"
```

As described above, the exemplary systems and methods described herein also implement ETL-level rollback. Each ETL process may append new records in some tables in a database. To support ETL-level data consistency, an automatically incremental attribute PRI_KEY for each table can be implemented. As such, for each new record inserted in a table, the PRI_KEY value automatically increments by 1.

FIG. 9 illustrates an exemplary rollback snapshot table. As illustrated, the rollback snapshot table includes four attributes: TABLE_NAME, MAX_KEY, and ISDONE. Each table in the database includes a corresponding record in this table. The shows the maximal PRI_KEY value for the latest completely ETL process. The ISDONE attribute indicates whether an ETL process is done already: "yes" means the ETL process is done, and "no" means the ETL process is not completed yet.

In exemplary embodiments, the ETL processes implement the rollback table to achieve data consistency, together with the exemplary locking mechanism. When an ETL process receives the locks, the ETL process first checks in the rollback snapshot table for all the tables it touches, whether the ISDONE values of those tables are all "yes". In exemplary embodiments, if all ISDONE are "yes", the ETL process changes these values to "no", and then starts the ETL loading. When all loadings are complete, the ETL process updates the ISDONE values to "yes" and the MAX_KEY values to the maximal PRI_KEY values for each corresponding table. In exemplary embodiments, if not all ISDONE values are "yes", another ETL process is failed without correcting the rollback snapshot table. In this case, the ETL process first cleans up the affected tables before the loading. The cleaning is done for each table with ISDONE="no". As such, all the records with PRI_KEY value larger than the MAX_KEY value are deleted.

For example, referring to FIG. 9, if an ETL process wants to load data into the table S, the ETL process needs to first run the following SQL to clean the tables. The following SQL statement can be implemented:

DELETE FROM S WHERE PRI_KEY>200

After the loading is done, the locks are released.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated The flow diagrams depicted herein are just one example. There may be many variations to this diagram or the steps (or operations) described therein without departing from the spirit of the invention. For instance, the steps may be performed in a differing order or steps may be added, deleted or modified. All of these variations are considered a part of the claimed invention.

While preferred embodiments to the invention have been described, it will be understood that those skilled in the art, both now and in the future, may make various improvements and enhancements which fall within the scope of the claims which follow. These claims should be construed to maintain the proper protection for the invention first described.

What is claimed is:

1. A method for concurrency management for extraction, transform, load (ETL) processes in a database having database tables and communicatively coupled to a computer, the method comprising:

establishing a session lock for the database having a plurality of tables;

determining that a first current ETL process is accessing the database at a current time;

determining that a second current ETL process is accessing the database at the current time;

responsive to the first and second current ETL processes reading from a first subset of the plurality of tables, the first current ETL process writing into a second subset of the plurality of tables, the second current ETL process writing into a third subset of the plurality of tables, the first, second and third subsets being mutually exclusive, executing the first and second ETL processes simultaneously;

associating a current expiration time with the session lock, the expiration time being stored in a lock table in the database;

sending the session lock to at least one of the first and second current ETL processes; and responsive to the first and second ETL processes writing into a common subset of the plurality of tables, performing ETL-level locking for the first current ETL process.

2. The method as claimed in claim 1 wherein performing ETL-level locking for the first current ETL process, comprises:

determining whether a prior expiration time set in the lock table occurs before the current time; and in response to a determination that the prior expiration time set in the lock table occurs before the current time, setting the lock table to the current expiration time.

3. The method as claimed in claim 2 further comprising:

in response to a determination that the first expiration time set in the lock table does not occur before the current time, waiting for a predetermined time period.

4. The method as claimed in claim 2 further comprising:

releasing the session lock.

5. The method as claimed in claim 4 wherein releasing the session lock comprises setting the current expiration time to the current time.

6. The method as claimed in claim 2 wherein the ETL-level locking is database-level exclusive locking.

7. The method as claimed in claim 2 wherein the ETL-level locking is table-level exclusive locking.

8. The method as claimed in claim 2 wherein the ETL-level locking is table-level read-write locking.

9. The method as claimed in claim 1 wherein the database includes a rollback snapshot table.

10. The method as claimed in claim 9 further comprising:
in response to sending the session lock, checking the rollback snapshot table to determine which database tables the first current ETL process touches;
determining if there has been a prior ETL process failure in the database that has affected the database tables that the current ETL process touches;
in response to a determination that there has been a prior ETL process failure in the database, cleaning the database tables that have been affected by the prior ETL process failure;
performing ETL loading; and
releasing the session lock.

11. A database residing in a memory that is communicatively coupled to a computer having a first current ETL process and a second current ETL process, the database comprising:
data accessible to the first current ETL process and the second current ETL process;
a plurality of tables;
at least one database table of the plurality of tables, including the data accessible to the first current ETL process; and
a lock table including an expiration time value for the second current ETL process, the second current ETL process accessing data accessible to the first current ETL process in the at least one database table,
wherein responsive to the first and second current ETL processes reading from a first subset of the plurality of tables, the first current ETL process writing into a second subset of the plurality of tables, the second current ETL process writing into a third subset of the plurality of tables, the first, second and third subsets being mutually exclusive, executing the first and second ETL processes simultaneously,
wherein responsive to the first and second ETL processes writing into a common subset of the plurality of tables, performing ETL-level locking for the first current ETL process.

12. The database as claimed in claim 11 wherein the first current ETL process is configured to check the lock table to determine if the database is locked to access by the at least one ETL process on a database level.

13. The database as claimed in claim 11 wherein the lock table further includes a table_name value.

14. The database as claimed in claim 13 wherein the first current ETL process is configured to check the lock table to determine if the database is locked to access by the at least one ETL process on a table level.

15. The database as claimed in claim 11 wherein the lock table further includes a table_name value, a lock_type value and an ID value.

16. The database as claimed in claim 15 wherein the first current ETL process is configured to check the lock table to determine if the database is locked to access by the at least one ETL process on a read-write level.

17. The database as claimed in claim 11 further comprising:
a rollback snapshot table configured to record and store a snapshot of the data accessible to the first current ETL process,
wherein the first current ETL process is configured to clean up the at least one database table in response to a failure of the prior ETL process.

18. A computer program product for concurrency management for extraction, transform, load (ETL) processes in a database having database tables and communicatively coupled to a computer, the computer program product including a non-transitory computer readable medium having instructions for causing the computer to implement a method, the method comprising:
establishing a session lock for the database having a plurality of tables;
determining that a first current ETL process is accessing the database at a current time;
determining that a second current ETL process is accessing the database at the current time;
responsive to the first and second current ETL processes reading from a first subset of the plurality of tables, the first current ETL process writing into a second subset of the plurality of tables, the second current ETL process writing into a third subset of the plurality of tables, the first, second and third subsets being mutually exclusive, executing the first and second ETL processes simultaneously;
associating a current expiration time with the session lock, the expiration time being stored in a lock table in the database;
sending the session lock to at least one of the first and second current ETL processes; and
responsive to the first and second ETL processes writing into a common subset of the plurality of tables, performing ETL-level locking for the current ETL process.

19. The computer program product as claimed in claim 18 wherein performing ETL-level locking for the first ETL process, comprises:
determining whether a prior expiration time set in the lock table occurs before the current time; and
in response to a determination that the prior expiration time set in the lock table occurs before the current time, setting the lock table to the current expiration time,
wherein the ETL-level locking is at least one of database-level exclusive locking, table-level exclusive locking and table-level read-write locking.

20. The computer program product as claimed in claim 18 wherein the database includes a rollback snapshot table configured to record and store a snapshot of data stored in the database.

* * * * *